US008041863B2

(12) United States Patent
Kwan et al.

(10) Patent No.: US 8,041,863 B2
(45) Date of Patent: Oct. 18, 2011

(54) AUTOMATED SOLUTION TO PROVIDE PERSONALIZED USER ENVIRONMENT ON ANY PUBLIC COMPUTER USING PORTABLE STORAGE DEVICES WITH PERSONALIZED USER SETTINGS UPLOADED TO LOCAL REGISTRY OF PUBLIC COMPUTER

(75) Inventors: Hung Tack Kwan, Grand Prairie, TX (US); Tassanee K. Supakkul, Euless, TX (US); Mathews Thomas, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 11/560,405

(22) Filed: Nov. 16, 2006

(65) Prior Publication Data

US 2008/0120439 A1 May 22, 2008

(51) Int. Cl.
*G06F 13/00* (2006.01)
*G06F 9/44* (2006.01)

(52) U.S. Cl. ............... 710/72; 710/73; 710/74; 710/62; 710/13; 710/104; 707/200; 707/204; 707/201; 717/120; 717/121; 717/122; 717/111; 715/789; 715/847; 715/745; 713/1; 713/2; 713/100

(58) Field of Classification Search .............. 710/62, 710/72–74; 715/789, 847, 745; 713/1, 2, 713/100, 159; 455/411; 711/1, 116; 726/3
See application file for complete search history.

(56) References Cited

U.S. PATENT DOCUMENTS

| 5,884,035 | A | 3/1999 | Butman et al. |
| 6,357,021 | B1 * | 3/2002 | Kitagawa et al. ............... 714/41 |
| 6,926,199 | B2 * | 8/2005 | Jay et al. ............... 235/375 |
| 6,986,038 | B1 | 1/2006 | Leah et al. |
| 7,028,308 | B2 * | 4/2006 | Kim ............... 719/321 |
| 7,239,877 | B2 * | 7/2007 | Corneille et al. ............ 455/456.3 |
| 7,299,422 | B2 * | 11/2007 | Levine et al. ............... 715/789 |
| 7,373,656 | B2 * | 5/2008 | Lang et al. ............... 726/3 |
| 7,441,108 | B2 * | 10/2008 | Fisher et al. ............... 712/227 |
| 7,600,216 | B2 * | 10/2009 | Shlomai ............... 717/111 |
| 7,620,667 | B2 * | 11/2009 | Rollin et al. ............ 707/999.204 |
| 7,865,878 | B2 * | 1/2011 | Weiner et al. ............... 717/122 |

(Continued)

OTHER PUBLICATIONS http://web.archive.org/web/*/http://www.portableapps.com, Search Results for Jan. 1, 1996-Oct. 11, 2009 printed Apr. 9, 2010.*

(Continued)

*Primary Examiner* — Tammara Peyton
(74) *Attorney, Agent, or Firm* — Patents on Demand, P.A.; Brian K. Buchheit; Scott M. Garrett

(57) ABSTRACT

The present invention permits registry settings and other pertinent shared artifacts to be distributed across many different computing devices. More specifically, the invention permits applications installed on an external drive to be activated, when the external drive is connected to a main computing device. When connected, a drive agent can detect registry settings stored on the external drive and can synchronize these settings with a main registry of the main computing device. Further, interface elements, such as icons for the new applications can be added to a GUI of the main computing device. Once the registry settings are included in the main registry, applications on the external drive can used from the main computing device. When the external drive is detached from the main computing device, the device agent can automatically remove all registry settings, shared artifacts, and interface elements.

18 Claims, 8 Drawing Sheets

U.S. PATENT DOCUMENTS

| | | | |
|---|---|---|---|
| 7,912,994 B2* | 3/2011 | Cornwell et al. | 710/14 |
| 2002/0135613 A1* | 9/2002 | O'Hara | 345/745 |
| 2003/0110371 A1* | 6/2003 | Yang et al. | 713/100 |
| 2004/0001088 A1* | 1/2004 | Stancil et al. | 345/748 |
| 2004/0073787 A1* | 4/2004 | Ban et al. | 713/159 |
| 2004/0128389 A1* | 7/2004 | Kopchik | 709/228 |
| 2004/0202126 A1 | 10/2004 | Leung et al. | |
| 2006/0117312 A1* | 6/2006 | Seo | 717/168 |
| 2006/0288168 A1* | 12/2006 | Stevenson | 711/115 |
| 2007/0214187 A1* | 9/2007 | Thomas et al. | 707/200 |
| 2007/0260998 A1* | 11/2007 | Levine et al. | 715/789 |
| 2008/0005121 A1* | 1/2008 | Lam et al. | 707/10 |
| 2008/0052776 A1* | 2/2008 | Prabhat et al. | 726/15 |
| 2008/0081559 A1* | 4/2008 | Parikh et al. | 455/41.2 |
| 2008/0126791 A1* | 5/2008 | Weiner et al. | 713/100 |

OTHER PUBLICATIONS

Moka5—Virtually everywhere—Mobility feature http://www.moka5.com/solutions/mobility.html, Apr. 7, 2007.*

Take your Digital Mojo (your applications, settings and data) with you on ANY device, and run on ANY PC http://www.mojopac.com/portal/content/what, Oct. 7, 2006.*

PortableApps.com http://portableapps.com/, Dec. 8, 2005.*

* cited by examiner

AUTOMATED SOLUTION TO PROVIDE PERSONALIZED USER ENVIRONMENT ON ANY PUBLIC COMPUTER USING PORTABLE STORAGE DEVICES WITH PERSONALIZED USER SETTINGS UPLOADED TO LOCAL REGISTRY OF PUBLIC COMPUTER

BACKGROUND

1. Field of the Invention

The present invention relates to the field of device access and, more particularly, to an automated solution to provide immediate requisite access to data and applications on an attached external device.

2. Description of the Related Art

Advances in portable hard drives and flash drives permit users to easily carry a tremendous amount of convenient storage space when traveling, which could in theory be used to satisfy their data and application needs. At present, however, portable storage devices are only useful for storing data and are unable to store applications that consume or manipulate the data. This is because use of most modern applications requires a set of Application Program Interfaces (APIs), Dynamic Link Libraries (DLLs), registry settings, and the like, which are stored on a main drive of an operating system at application installation time. Consequently, data can be transported on external drives, but is often unable to be used because access to a necessary and corresponding application is unavailable.

A wide variety of solutions have been developed to ensure users have access to needed applications. One attempted solution is to continuously install and uninstall application programs, such as from images stored on the portable drive. This solution has many flaws. First, users are often not granted access to install programs on public use machines, such as those found at libraries, internet cafés, and airports. Further, constantly installing and removing programs is a practice that corrupts a registry and shared library stores, is time consuming, and may even be impossible due to computer specific hashes used to "activate" many software programs.

One technique that could minimize some of the flaws with repetitive install and uninstall operations is application virtualization. Commercial application virtualization solutions are currently provided by companies such as Atiris, Inc., Softricity Inc., and AppStream Inc. Application virtualization creates a virtual application layer between an operating system and an application. This layer is activated when a program is installed. The virtual application layer functions as a proxy between a registry and an installed application, where application specific settings are placed in the virtual application layer. If an application is moved from one machine to another that includes the same virtual application layer, machine-specific settings do not have to be adjusted. In order for a virtualized application to execute, the application virtualization layer first needs to be executing.

This solution fails to overcome problems involving insufficient permission to install applications. Permission problems are actually increased, since creating a new application virtualization layer on a machine is a very intrusive process typically requiring system administrator privileges. Further, application virtualization fails to address situations of executing applications from a periodically removed external drive. When the drive is present, necessary application programs can exist. When removed, these programs will be absent, creating problems and errors when an associated icon or shortcut is selected.

A traditional solution to ensuring application availability is to create an application server on the network that allows a multitude of users to access an application. However, the application server is only accessible when a user is connected to the network. Thus, the issue of needing additional hardware and software to overcome the distance resurfaces in order to provide a remote user with access. Further, network latency issues can result in application performance that is below an acceptable level. This can be especially true when a traveler is accessing a served application over a low quality network connection.

In addition to issues of hardware and performance, current software licensing practices are a precarious quagmire of issues relating to applications. Most commercial software requires a license and/or activation for each installation of the application, whether or not the additional installation is for the same user. A user can easily consume multiple licenses in order to accommodate an assortment of devices that are necessary to provide them access in a variety of locations and situations. For example, a user may need a license for a work computer, a home computer, a laptop computer, and the like. Conventional solutions working with the current licensing system severely limit a user and a company in terms of portability and affordability.

SUMMARY OF THE INVENTION

The present invention permits registry settings and other pertinent shared artifacts to be distributed across many different computing devices. More specifically, the invention permits applications installed on an external drive to be activated, when the external drive is connected to a main computing device. When connected, a drive agent can detect registry settings stored on the external drive and can synchronize these settings with a main registry of the main computing device. Further, interface elements, such as icons for the new applications, can be added to a GUI of the main computing device. Once the registry settings are included in the main registry, applications on the external drive can be used from the main computing device. When the external drive is detached from the main computing device, the device agent can automatically remove all registry settings, shared artifacts, and interface elements.

The present invention can be implemented in accordance with numerous aspects consistent with the material presented herein. For example, one aspect of the present invention can include a method for permitting applications stored within an external drive to execute from a software environment of a computing device whenever the external drive is connected to the computing device. The method can include a step of storing within an external drive at least one external software application, wherein external configuration items relating to the software application can be stored in an external configuration store of the external device. The external drive can be connected to a computing device. The computing device can have a local configuration store that includes local configuration items related to local software applications installed within a local software environment of the computing device. External configuration items can be automatically added to the local configuration store, which can permit the external software application to execute from within the local software environment. The external drive can later be disconnected from the computing device, which results in the external configuration items being automatically removed from the local configuration store.

Another aspect of the present invention can include a method for permitting software applications installed on a removable external device to be used in a local environment. In the method, a software application can be installed to an external drive. Installation can involve creating configuration items for the software application within an external configuration store of the external drive. An event can automatically detect when the external drive is connected to a local computing device hosting a local software environment having a local configuration store. The adding of the drive can cause configuration items for the installed software application to be dynamically and automatically added to the local configuration store. The added configuration items can include at least one configuration item that adds a graphical item to a graphical user interface of the local software environment. The added configuration items can also include at least one configuration item that causes the local software environment to associate at least one file type with the external software application. A user selection of the graphical item or file having the associated file type can cause the external software application to execute within the local software environment.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
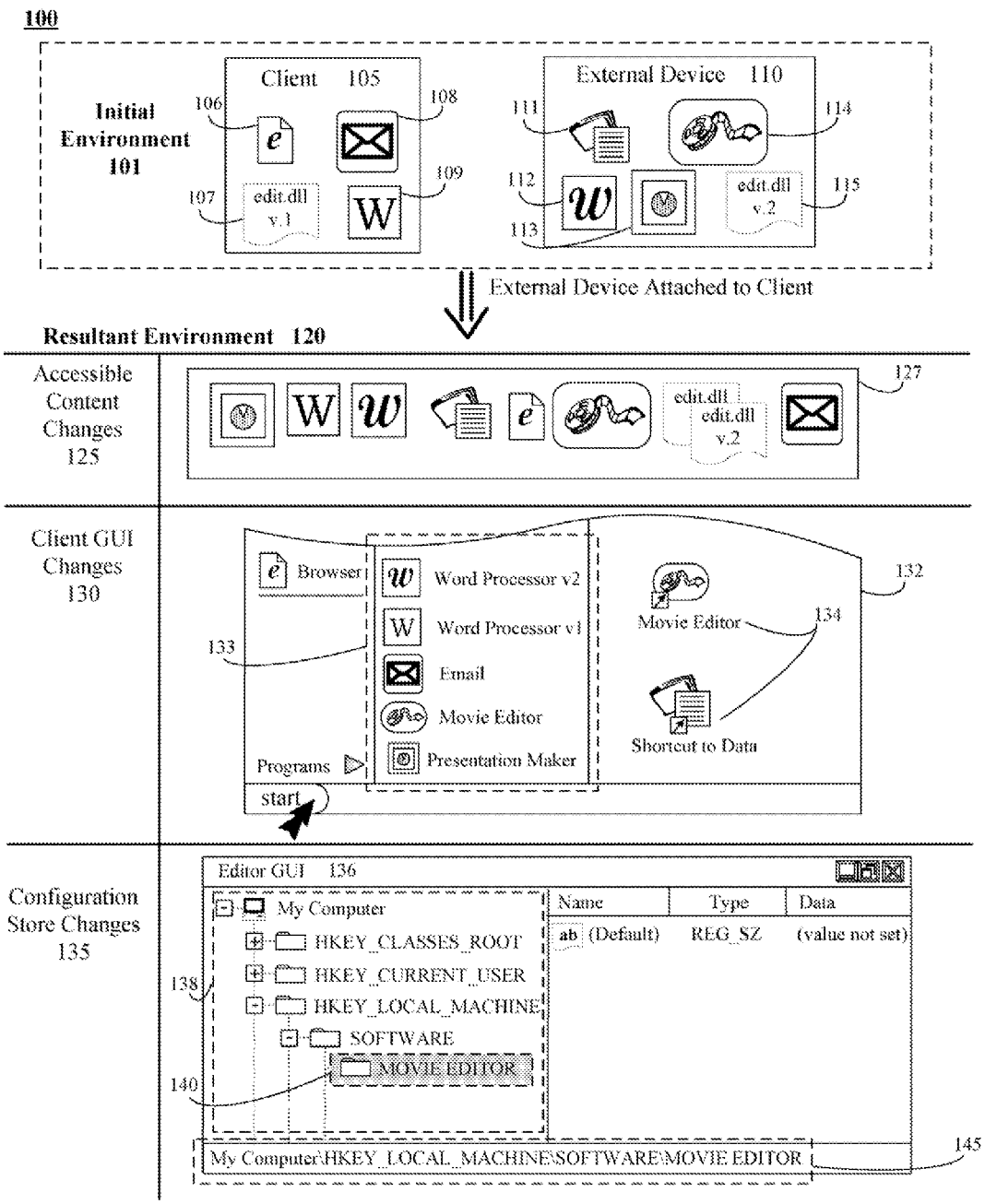
FIG. 1 is a graphical representation illustrating changes in a client environment when attaching an external device in accordance with an embodiment of the inventive arrangements disclosed herein.

FIG. 1 is a graphical representation 100 illustrating changes in a client environment when attaching an external device in accordance with an embodiment of the inventive arrangements disclosed herein. The changes illustrated in this graphical representation 100 can occur in the context of system 200 or any other system supporting immediate requisite access to data and applications on an attached external device in an automated fashion.

The initial environment 101 contains the contents of the external device 110 prior to the attachment of the external device 110 to the client 105. It should be appreciated that the contents of the client 105 and external device 110 are for illustrative purposes only and are not meant as limitation of the invention. In this example, the client 105 contains a library file 107 and has and email application 108, Web browser 106, and word processing application 109. The external device 110 contains a newer library file 115 and data files 111 and has a newer version of the word processing application 112, a presentation application 113, and a movie editor application 114.

The attachment of external device 110 to client 105 can produce resultant environment 120. The resultant environment 120 can include accessible content changes 125, client graphical user interface (GUI) changes 130, and configuration store changes 135. The accessible contents 127 can be a result of the accessible content changes 125 in the resultant environment 120.

As shown in this example, the accessible contents 127 can display the union of available content from the client 105 and external device 110. It should be noted that the device agent 112 of system 100 can allow for the coexistence of multiple versions of the same application, as in word processing applications 109 and 112, and the replacement of an older file with a newer version, as in library file 107 being replaced with library file 115. The accessible contents 127 can be displayed within the client GUI changes 130.

Client GUI changes 130 can include a display of desktop 132. Desktop 132 can display the changes made when external device 110 is connected to the client 105. The applications and data contained on the external device 110 can be made available to a user on client 105 via program icons 133 and shortcuts 134. Selection of a program icon 133 or shortcut 134 can access the associated data or application on the external device 110.

Connecting external device 110 to client 105 can also result in configuration store changes 135. A format of the configuration store can be dependent upon the operating system used by the client 105. This example utilizes a WINDOWS environment. As such, the editor GUI 136 reflects the registry used in WINDOWS to store this information. The concepts expressed herein are not limited to any particular platform or operating system.

The configuration store changes 135 made to client 105 can be viewed in an editor GUI 136. Since the movie editor application 114 resides on the external device 110, the registry of the client 105 can be modified, as shown in the registry display 138, so the movie editor application 114 can be run on the client 105. The highlighted entry 140 can be added to the registry of the client 105 in order for it to run the movie editor application 114. Additionally, the editor GUI 136 can display the path 145 for the highlighted entry 140.

Figure 2:
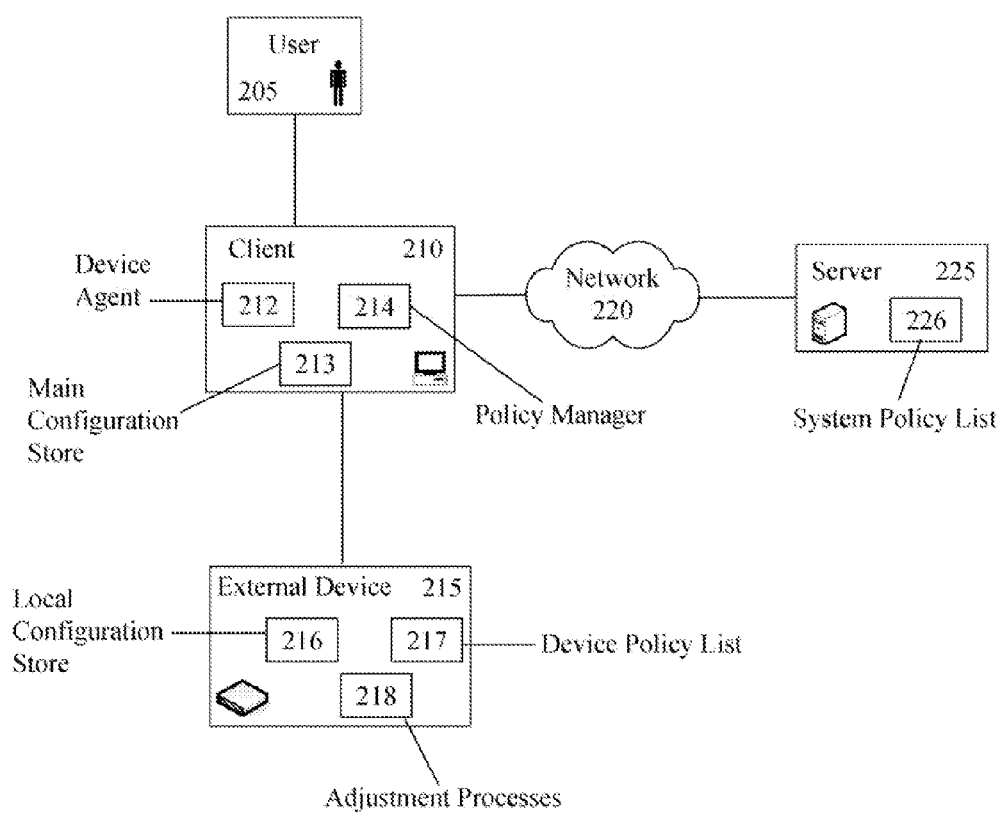
FIG. 2 is a schematic diagram illustrating a system for providing automated and immediate requisite access to data and applications on an attached external device i accordance with embodiments of the inventive arrangements disclosed herein.

FIG. 2 is a schematic diagram illustrating a system 200 for providing automated and immediate requisite access to data and applications on an attached external device in accordance with embodiments of the inventive arrangements disclosed herein. In system 200, the external device 215 can be directly connected to the client 210 to provide a user 205 with direct access to the contents of the external device 215. Connectivity can be provided by a variety of means, including, but not limited to, a Universal Serial Bus (USB) connection, FIREWIRED, BLUETOOTH, WIFI, an Ethernet cable, a null modem cable, a connection utilizing a parallel interface cable, and the like.

The client 210 can be any of a variety of devices used by a user 205 that can support the direct attachment of an external device 215 and communicatively linked to a server 225 by a network 220. By extension, applications residing on the external device 215 can access the server 225 through its connection to the client 210.

The client 210 can include a device agent 212, main configuration store 213, and a policy manager 214. The device agent 212 can be a software application that synchronizes data between the client's 210 main configuration store 213 and the local configuration store 216 of an external device 215 and enforces the access policy determined by the policy manager 214. The device agent 212 can be responsible for the modifications to the main configuration store 213 that allow the user 205 to run software applications installed on the external device 215 from the client 210 machine. Additionally, the device agent 212 can reverse modifications upon the removal of the external device 215 from the client 210.

The main configuration store 213 can be a memory location of the client 210 designed to contain hardware and software configuration information as well as user preferences. It should be noted that the actualization of the main configuration store 213 is dependent upon the operating system in use on the client 210. For example, in a WINDOWS platform, the main configuration store is called the registry; in a UNIX environments, the main configuration store is called the global registry and stored in a specific file and location. Additionally, the data that would be expected to be stored within the main configuration store 213 can also be spread out over multiple files and/or locations on the client 210, as in the case of a MACINTOSH.

The policy manager 214 can be a software application that attempts to negotiate and enforce an inclusive access policy for items contained on the external device 215. This access policy can be formulated from a device policy list 217 stored on the external device 215 as well as a system policy list 226. The system policy list 226 can reside upon an accessible server 225 or other available networked component. Alternately, the system policy list 226 con reside upon the client 210. A policy list can contain data pertaining to the access of data and applications. For example, a policy list can include digital certificates, licensing information, user permissions, and the like.

It should be appreciated that the policy negotiated by the policy manager 214 from the policy lists 217 and 226 can limit a user's 105 access to network resources. For example, a service agent can take an external hard drive containing all data and applications necessary to perform his duties to a customer site. At the customer site, the server agent can connect the external hard drive to a computer on the customer's network to perform tasks. The customer's network may contain data files that should not be accessible to the service agent. This access restriction can be contained in a system policy list on the customer's network. Therefore, the policy negotiated by the policy manager on the customer's computer can include this restriction and the designated data files and/or areas will be unavailable to the service agent.

The external device 215 can be any of a variety of devices capable of storing data and/or applications and connecting to a client 210. In addition to applications and/or data, the external device 215 can include a local configuration store 216, a device policy list 217, and adjustment processes 218. The local configuration store 216, similar to the main configuration store 213 of the client 210, can contain hardware and software configuration information and user preferences specific to the external device 215 and any data and/or applications stored upon it. It should be noted that the structure of the local configuration store 216 should correspond to that of the main configuration data store 213, which should be aligned with the operating system of the client 210.

It should be appreciated that this aspect of the invention allows for complete portability of a software license. For example, an installation of a word processing application will function on any compatible client 210 machine regardless of location and network access. Thus, a user can install all necessary applications on an external device 215 and access them from any client 210 in any location. In such an example, the loaded external device 215 could take the place of a traditionally loaded laptop computer.

The adjustment processes 218 can be one or more software routines designed to modify elements of the client 210 in order for the user 205 to access applications on the external device 215. Copying files, updating entries in the main and/or local configuration stores, and reversing previous actions are examples of modifications that can be made by adjustment processes 218.

In another contemplated embodiment, the external device 215 can be attached to the server 225 instead of client 210. The user can then access the contents of the external device 215 over the network 220 providing that the server 225 is available.

Network 220 can include any hardware/software/and firmware necessary to convey data encoded within carrier waves. Data can be contained within analog or digital signals and conveyed though data or voice channels. Network 220 can include local components and data pathways necessary for communications to be exchanged among computing device components and between integrated device components and peripheral devices. Network 220 can also include network equipment, such as routers, data lines, hubs, and intermediary servers which together form a data network, such as the Internet. Network 220 can also include circuit-based communication components and mobile communication components, such as telephony switches, modems, cellular communication towers, and the like. Network 220 can include line based and/or wireless communication pathways.

Figure 3:
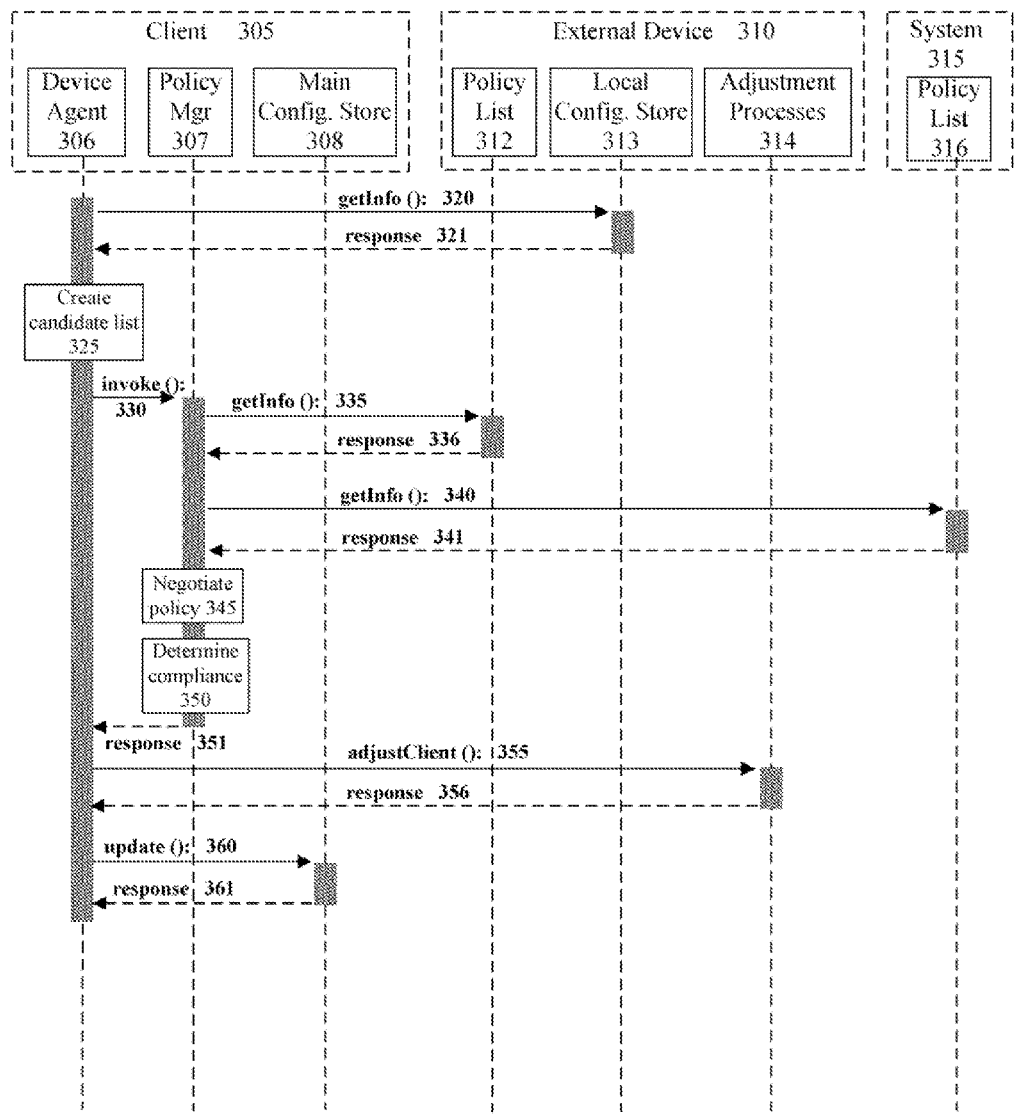
FIG. 3 is a graphical representation illustrating the basic interactions between components when an external device is attached to a client in accordance with an embodiment of the inventive arrangements disclosed herein.

FIG. 3 is a graphical representation 300 illustrating the basic interactions between components when an external device is attached to a client in accordance with an embodiment of the inventive arrangements disclosed herein. The interactions illustrated in this graphical representation 300 can occur in the context of system 200 or any other system supporting immediate requisite access to data and applications on an attached external device in an automated fashion.

The client 305 can include device agent 306, policy manager 307, and main configuration store 308. The external device 310 can include policy list 312, local configuration store 313, and adjustment processes 314. The system 315 can include a policy list 316. The interaction between the various components can be shown by the various request and responses of the graphical representation 300.

Interaction between the various components can begin once an external device 310 is attached to the client 305. At this time, the device agent 306 can issue a get info request 320 to the local configuration store 313 of the external device 310. The requested information can be returned to the device agent 306 via response 321.

Upon the receipt of response 321, the device agent 306 can execute a procedure 325 to create a candidate list. Once the candidate list is created, the device agent 306 can issue an invoke command 330 to the policy manager 307. The policy manager 307 can then send a get info request 335 to the external device 310 requesting the information contained within its policy list 312. This information can be returned to the policy manager 307 via response 336. Next, the policy manager 307 can send a get info request 340 to the client's 305 system 315. The system 315 can return the information contained within its policy list 316 via response 341.

Once the policy manager 307 receives the information for both policy lists 312 and 316, it can execute code 345 to negotiate a policy. After the negotiation, the policy manager 307 can execute another procedure 350 to determine the compliance of the candidate list with the negotiated policy. The resultant policy and compliance list can be returned to the device agent 306 in response 351.

The device agent 306 can make modifications to the client 305 environment to accommodate items contained on the compliance list by issuing an adjust client command 355 to the adjustment processes 314. The adjustment processes 314 can perform actions, such as copying files and modifying data entries of the local configuration store 313, as specified by the device agent 306. Completion of the adjust client command 355 can be contained within a response 356 to the device agent 306.

Lastly, the device agent 306 can issue an update command 360 to the main configuration store 308 of the client 305. The update command 360 can change the entries and data values of entries within the main configuration store 308 for allowing a user to run applications installed on the external device 310. Confirmation of changes can be returned to the device agent 306 in response 361.

Figure 4:
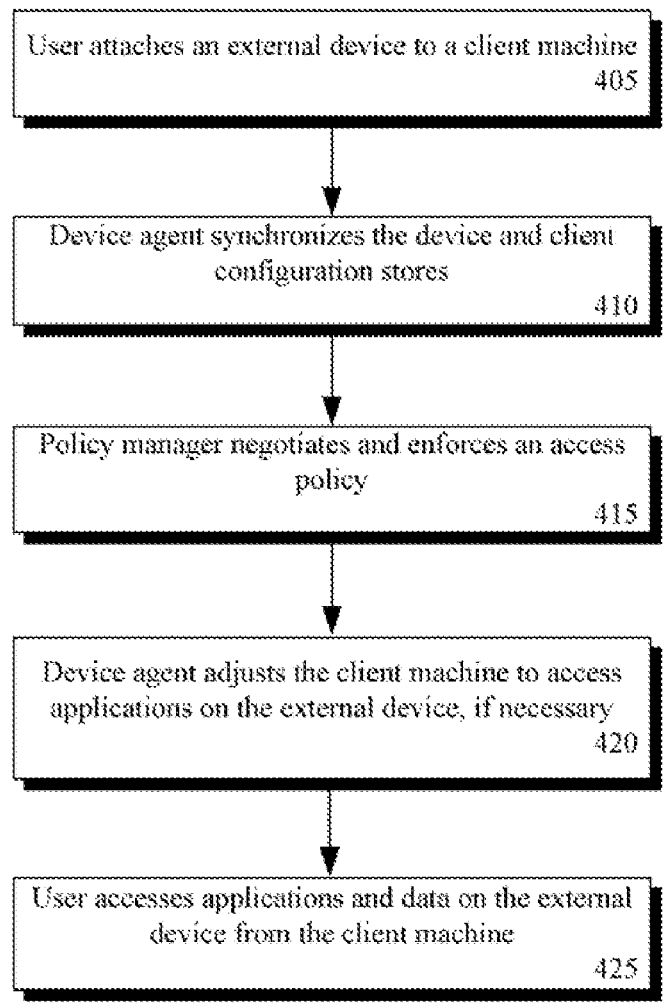
FIG. 4 is a flow chart of a method for providing automated and immediate requisite access to data and applications on an attached external device in accordance with an embodiment of the inventive arrangements disclosed herein.

FIG. 4 is a flow chart of a method 400 for providing automated and immediate requisite access to data and applications on an attached external device in accordance with an embodiment of the inventive arrangements disclosed herein.

Method 400 can begin in step 405 when a user attaches an external device to a client machine. This triggers step 410 where the device agent can synchronize the configuration stores of the client machine and external device. In step 415, the policy manager can negotiate and enforce an access policy.

In response to the negotiation and enforcement of the access policy, step 420 occurs where the device agent can adjust the client machine to provide access to applications residing on the external device as necessary. The user can then access any applications and data on the external device that comply with the access policy from the client machine in step 425.

Figure 5:
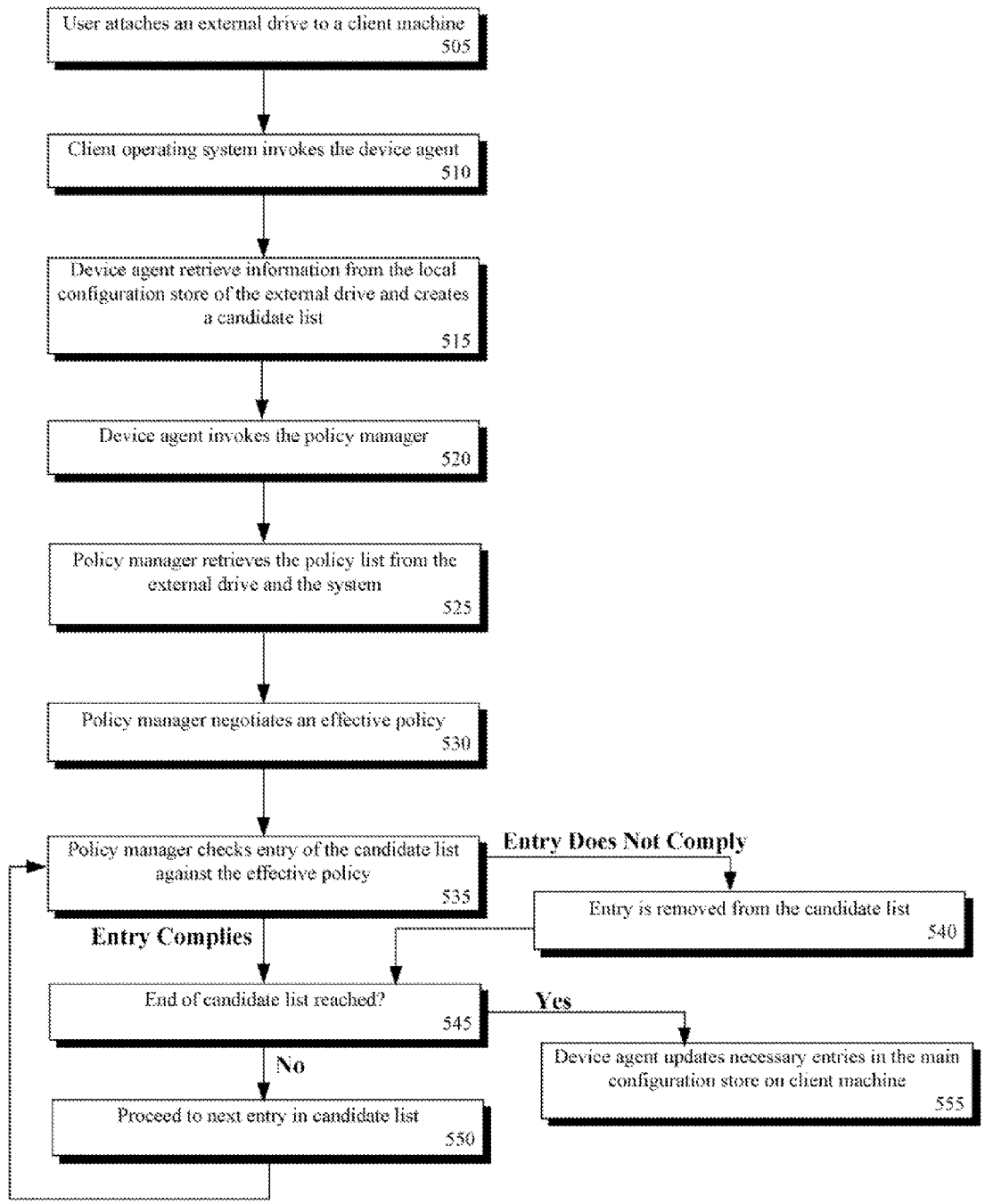
FIG. 5 is a flow chart of a method detailing the automated and immediate requisite access to data and applications on an attached external hard drive in accordance with an embodiment of the inventive arrangements disclosed herein.

FIG. 5 is a flow chart of a method 500 detailing the automated and immediate requisite access to data and applications on an attached external hard drive in accordance with an embodiment of the inventive arrangements disclosed herein.

Method 500 can begin in step 505 where a user can attach an external hard drive to a client machine. In step 510, the client's operating system can detect the addition of the new hardware and invoke the device agent. It should be noted that the device agent can be run in a passive state until needed to increase responsiveness.

In step 515, the device agent can retrieve information from the local configuration store of the external hard drive and create a candidate list. The candidate list can include the applications and data files contained on the external drive. In step 520, the device agent can invoke the policy manager.

The policy manager retrieves the policy list from the external drive and the client's system in step 525. In step 530, the policy manager can negotiate an effective policy. Next, the policy manager checks an entry of the candidate list against the effective policy in step 535. Should the candidate list entry not comply with the effective policy, flow proceeds to step 540 where the entry can be removed from the candidate list.

Should the candidate list entry comply with the effective policy or a non-compliant entry removed from the list, flow proceeds to step 545 where it can be determined if the end of the candidate list has been reached. If more entries exist on the candidate list, then step 550 occurs where the device agent can move to the next entry in the list. After the execution of step 550, flow loops back to step 535. Once the end of the candidate list has been reached, step 555 is executed where the device agent can modify the client's main configuration store.

Figure 6:
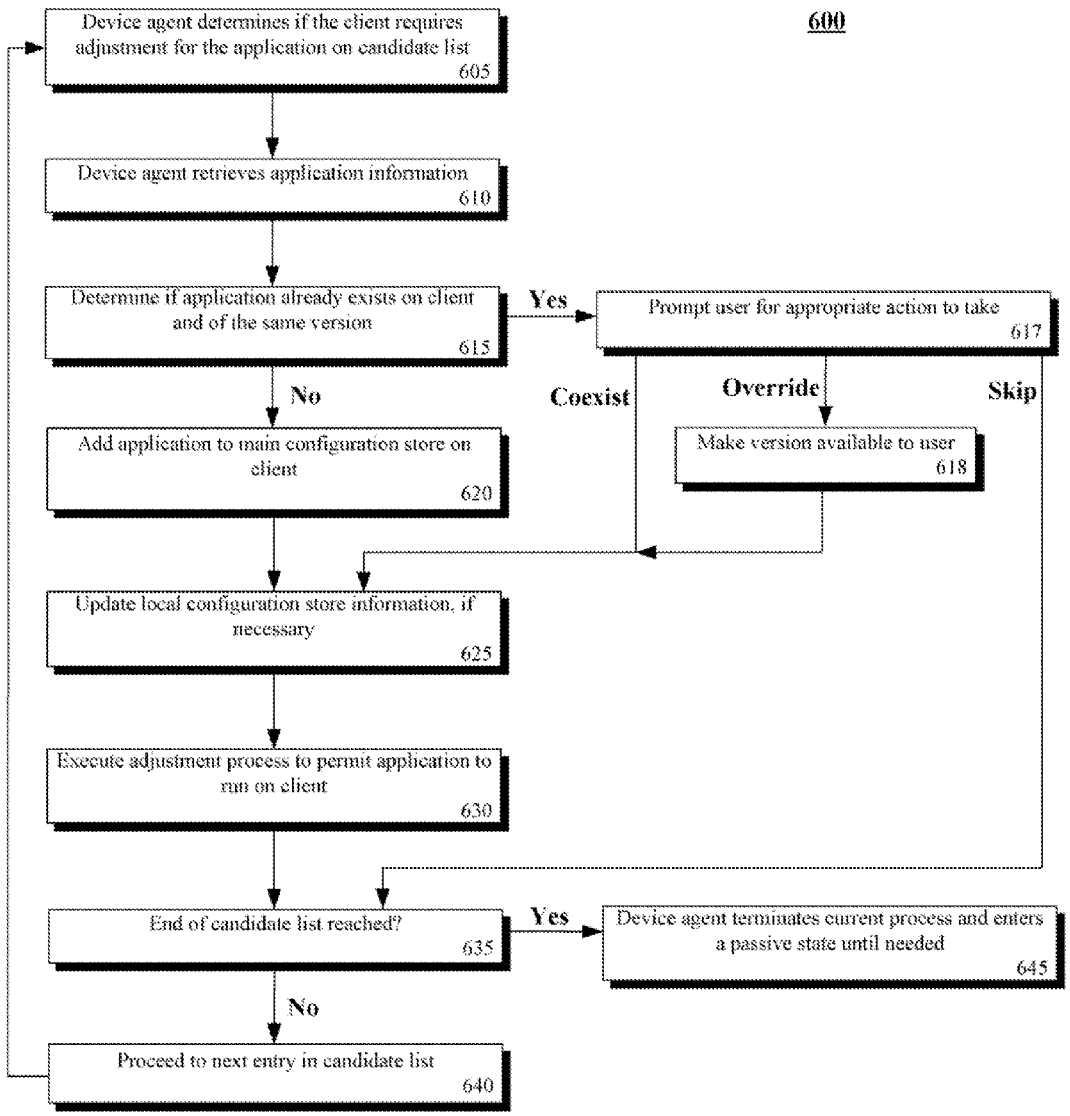
FIG. 6 is a flow chart of a method detailing the adjustment process to provide automated and immediate requisite access to applications on an attached external hard drive in accordance with an embodiment of the inventive arrangements disclosed herein.

FIG. 6 is a flow chart of a method 600 detailing the adjustment process to provide automated and immediate requisite access to applications on an attached external hard drive in accordance with an embodiment of the inventive arrangements disclosed herein.

Method 600 can be an extension of method 500, continuing where method 500 ended. Therefore, method 600 begins with step 605 where the device agent can determine if the client machine requires adjustment in order to run the application specified on the candidate list. In step 610, the device agent can retrieve application information. Upon receipt of this information, the device agent can determine if the application already exists on the client machine in step 615.

Should the application already exist on the client, then flow proceeds to step 617 where the device agent can prompt the user for the appropriate action to take. It should be noted that additional actions can be implemented with additional steps necessary and that those illustrated in method 600 are for illustrative purposes only.

If the user opts to have the specified application version override the version that is available on the client, then step 618 is executed where the device agent can make the necessary modifications to override the existing version. Upon completion of step 618, flow proceeds to step 625. Should the user opt to have both application versions coexist on the client, flow also proceeds to step 625. The user could also opt to skip any action for the application, branching flow to step 635.

However, if step 615 determines that the application does not exist on the client, then step 620 occurs where the device agent can add the application's information to the main configuration store on the client machine. Step 625 then occurs where the device agent can update the local configuration store of the external hard drive, if necessary.

In step 630, the device agent can execute an appropriate adjustment process allowing the client machine the ability to run the application. Step 635 can then determine if the end of the candidate list has been reached. If more entries exist on the candidate list, then step 640 occurs where the device agent can move to the next entry in the list. After the execution of step 640, flow loops back to step 605. Once the end of the candidate list has been reached, Step 645 is executed where the device agent can terminate its processing and enter a passive state until needed.

Figure 7:
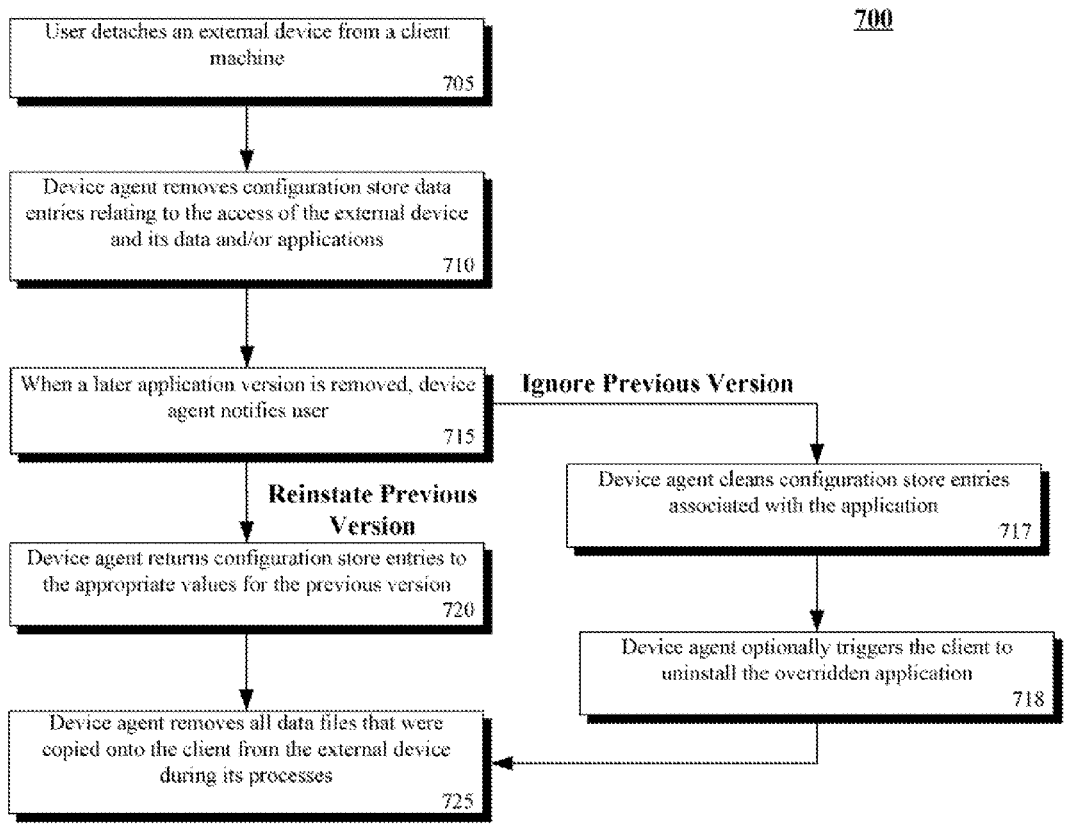
FIG. 7 is a flow chart of a method detailing the changes to a system that provides automated and immediate requisite access to applications on an attached external device when the external device is removed from the system in accordance with an embodiment of the inventive arrangements disclosed herein.

FIG. 7 is a flow chart of a method 700 detailing the changes to a system that provides automated and immediate requisite access to applications on an attached external device when the external device is removed from the system in accordance with an embodiment of the inventive arrangements disclosed herein.

Method 700 can begin with step 705 where a user can detach an external device from a client machine. In step 710, the device agent can remove data that was added to the configuration data stores, both local and main, when the external device was added to the client. Additionally, the device agent can remove any data files that were copied to the client from the external device.

In the case when the device agent attempts to remove an application version that is later than what was on the client originally, the deice agent can notify the user in step 715. Should the user desire to reinstate the previous application version, step 720 is executed where the device agent can reset configuration store entries to values appropriate for the previous version.

Flow branches to step 717 should the user desire to ignore the previous application version. In step 717, the device agent can clean the configuration store entries associated with the application. The device agent can optionally trigger the client to uninstall the application in step 718.

Lastly, step 725 is executed where the device agent can remove all data files that were copied onto the client from the external device. It should be noted that the actions performed in steps 717, 718, 720, and 725 can be included as functions in adjustment processes. These steps were detailed specifically to illustrate the depth of changes made during this method 700.

Figure 8:
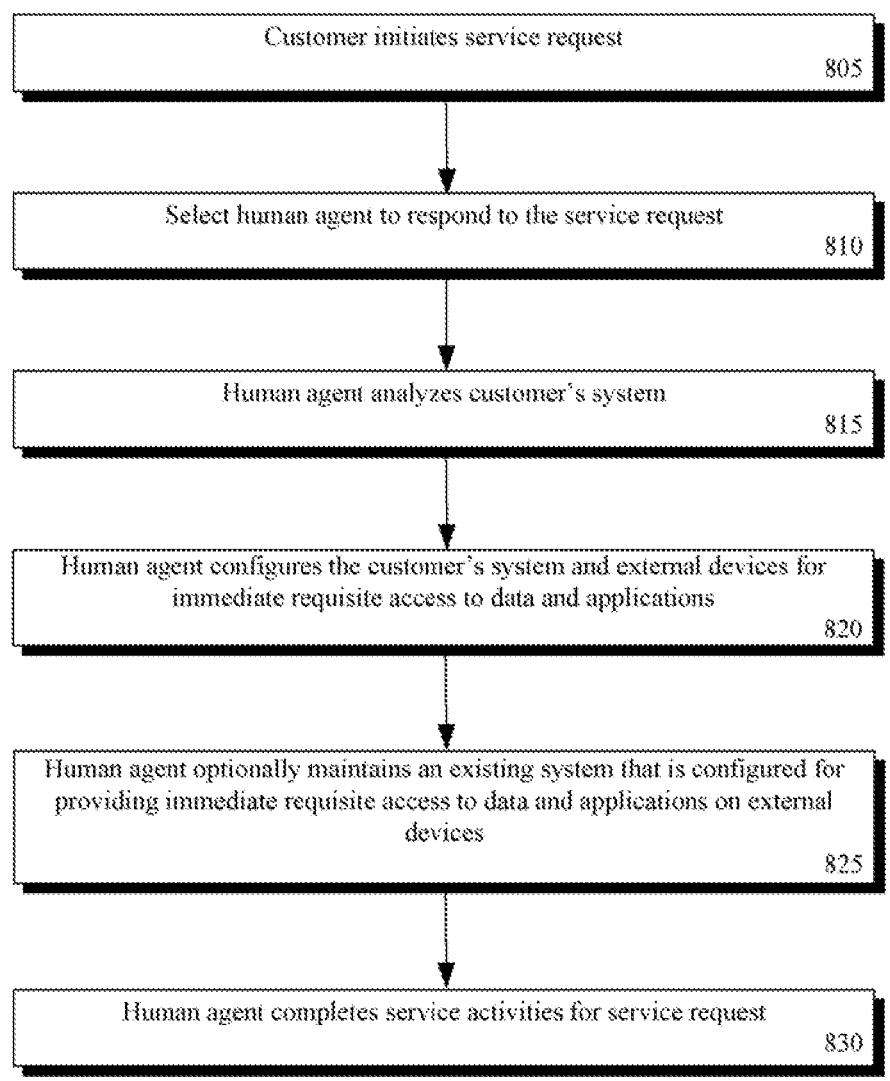
FIG. 8 is a flow chart of a method where a service agent can configure a system to provide automated and immediate requisite access to applications on an attached external device in accordance with an embodiment of the inventive arrangements disclosed herein.

FIG. 8 is a flow chart of a method 800 where a service agent can configure a system to provide automated and immediate requisite access to applications on an attached external device in accordance with an embodiment of the inventive arrangements disclosed herein.

Method 800 can begin in step 805, when a customer initiates a service request. The service request can be a request for a service agent to establish a new system to provide automated and immediate requisite access to applications on an attached external device. The service request can also be a request to troubleshoot a problem with an existing system that provides automated and immediate requisite access to applications on an attached external device.

In step 810, a human agent can be selected to respond to the service request. In step 815, the human agent can analyze a customer's current system and can develop a solution. The solution can result in system 200 or any system supporting immediate requisite access to data and applications on an attached external device in an automated fashion, such as a system that performs the steps of method 400.

In step 820, the human agent can configure the customer's system to provide automated and immediate requisite access to applications on an attached external device. This can include the installation of a device agent and policy manager on the client machine. This can also include the installation of a local configuration store and adjustment processes on an external device as well as the implementation of a policy list.

In step 825, the human agent can optionally maintain an existing system that is configured to provide immediate requisite access to data and applications on external devices for the customer. In step 830, the human agent can complete the service activities.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A method for permitting applications stored within an external drive to execute from a software environment of a computing device whenever the external drive is connected to the computing device, comprising:

installing within an external drive at least one external software application, including storing external configuration items relating to the software application in an external configuration store of the external drive;

connecting the external drive to a computing device, said computing device having a local configuration store including local configuration items related to local software applications installed within a local software environment of the computing device, wherein the local configuration store and the external configuration store include different versions of a same runtime component;

automatically adding the external configuration items to the local configuration store, wherein the adding step permits the external software application installed on the external device to execute from within the local software environment;

activating within the local software environment, a most current one of the different versions of the same runtime component, wherein the activating is selectively user-enabled for the same runtime component and wherein the activating results in the most current version being linked to files in the local software environment having file types associated with the same runtime component;

disconnecting the external drive from the computing device; and automatically removing the external configuration items from the local configuration store in response to disconnecting the external drive.

2. The method of claim 1, wherein the connecting step and the disconnecting steps are automatically detected by the computing device, wherein detection of the connecting step triggers the adding step, and wherein the detection of the disconnecting step triggers the removing step.

3. The method of claim 1, wherein at least one of the added external configuration items adds a graphical item to a graphical user interface of the local software environment, wherein a user selection of the added graphical item causes the external software application to execute within the local software environment.

4. The method of claim 1, wherein at least one of the added external configuration items causes the local software environment to associate at least one file type with the external software application, wherein after the association, a user selection of a file having the file type causes the external software application to execute within the local environment and to automatically open the file within the executing application.

5. The method of claim 1, wherein the external configuration items include a set of security policies relating to the external software application, wherein the adding step causes this set of security policies to be applied when the external software application is accessed from the local software environment.

6. The method of claim 1, wherein the external configuration items include at least one of an application program interface and a dynamic link library.

7. The method of claim 1, wherein the connecting step occurs through at least one of a Universal Serial Bus (USB) connection, a FIREWIRE connection, and an external Serial ATA connection.

8. The method of claim 1, wherein the local configuration store is an application registry for a MICROSOFT WINDOWS based platform or equivalent on other platforms.

9. The method of claim 1, wherein the steps of claim 1 are performed by at least one of a service agent and a computing device manipulated by the service agents, the steps being performed in response to a service request.

10. The method of claim 1, wherein said steps of claim 1 are performed by at least one machine in accordance with at least one computer program having a plurality of code sections that are executable by the at least one machine.

11. A method for permitting software applications installed on a removable external drive to be used in a local environment comprising:
  installing a software application to an external drive, including creating a plurality of configuration items for the software application within an external configuration store of the external drive;
  automatically detecting when the external drive is connected to a local computing device hosting a local software environment having a local configuration store;
  wherein the local configuration store and the external configuration store include different versions of a same runtime component;
  dynamically and automatically adding the configuration items for the installed software application to the local configuration store, wherein said added configuration items includes at least one configuration item to facilitate execution of the external software application installed on the external device to be executed in the local software environment, and at least one configuration item that adds a graphical item to a graphical user interface of the local software environment and includes at least one configuration item that causes the local software environment to associate at least one file type with the external software application, wherein a user selection of at least one of the graphical item and a file having the associated file type causes the external software application installed on the external device to execute within the local software environment; and
  activating within the local software environment, a most current one of the different versions of the same runtime component, wherein the activating is selectively user-enabled for the same runtime component and wherein the activating results in the most current version being linked to files in the local software environment having file types associated with the same runtime component application.

12. The method of claim 11, further comprising:
  automatically detecting when the external drive is disconnected from the local computing device; and
  dynamically and automatically removing the added configuration items associated with the installed software application.

13. The method of claim 12, further comprising: connecting the external drive to a different local computing device, wherein the detecting and adding steps are automatically performed for the different local computing device.

14. The method of claim 11, wherein the external drive includes a plurality of installed software applications and related configuration items, and wherein the adding step further comprises:
  adding configuration items for the plurality of installed software applications to the local configuration store.

15. The method of claim 11, wherein the external drive is connected to the local computing device through at least one of a Universal Serial Bus (USB) connection, a FIREWIRE connection, and an external Serial ATA connection.

16. The method of claim 11, wherein the local configuration store is an application registry for a MICROSOFT WINDOWS based platform or equivalent on other platforms.

17. The method of claim 11, wherein said steps of claim 11 are performed by at least one machine in accordance with at least one computer program having a plurality of code sections that are executable by the at least one machine.

18. The method of claim 11, wherein the steps of claim 11 are performed by at least one of a service agent and a computing device manipulated by the service agents, the steps being performed in response to a service request.

* * * * *